United States Patent Office 3,277,016
Patented Oct. 4, 1966

3,277,016
REGENERATION OF HEAT-DEGRADED CATALYST BY TREATMENT WITH AMMONIUM HYDROXIDE
Gregor H. Riesser, Pasadena, Tex., assignor to Shell Oil Company, New York, N.Y., a corporation of Delaware
No Drawing. Filed May 14, 1964, Ser. No. 367,562
4 Claims. (Cl. 252—412)

This invention relates to the regeneration of heat-degraded catalysts employed in oxidative conversion processes and relates more particularly to the regeneration of bismuth-containing oxidative conversion catalysts.

Catalysts containing bismuth as an essential component, to the treatment or regeneration of which the present invention is directed, find application broadly in processes involving the oxidative conversion of organic compounds. Processes directed to the oxidative conversion of hydrocarbons with the aid of bismuth-containing catalysts comprise, for example: (1) the oxidative dehydrogenation of olefinic hydrocarbons to less saturated hydrocarbons, for example, in the presence of a bismuth molybdate catalyst as described in U.S. 2,991,320, or in the presence of a bismuth tungstate catalyst as described in U.S. 2,991,322, or a bismuth phosphate catalyst as described in U.S. 2,991,321; (2) the incomplete oxidation of olefins to unsaturated aldehydes in the presence of a bismuth molybdate or bismuth phosphomolybdate catalyst as described in U.S. 2,941,007; (3) the reaction of olefins with oxygen and ammonia in the presence of bismuth-containing catalyst, for example, as described in Belgian Patent 598,511.

It is sometimes desirable and often essential to subject the bismuth-containing catalysts to elevated temperatures. This may consist of a pretreatment of the catalyst by such methods as heating, heating in an atmosphere of air, oxygen, ammonia, water vapor, hydrocarbons, inert gas, etc. Such thermal treatment may be for the purpose of modifying surface area, driving off volatile ingredients remaining from the preparation of the catalysts, decomposing residual materials therein, etc. After continuous use of the catalyst, reactivation by thermal treating methods similar to those used in thermal pretreating of the catalyst, but generally at more elevated temperatures, is employed. When heated to elevated temperatures—i.e., exposed to temperatures in the vicinity of their melting point and beyond—these catalysts often suffer loss of activity for the desired oxidative processes, which loss is practically irreversible by the prior-mentioned pretreating or reactivating methods. For the purposes of this invention catalysts so inactivated shall be defined as heat-degraded catalysts. The heat-degradation or irreversible inactivation may occur in two distinctly different situations. In the first, the heat-degradation may be a completely accidental overheating due either to highly exothermic reaction occurring in start-up of a process or to uncontrolled "hot spots" forming in situ during a continuous process or even to temperature-control malfunction in the reactor. Such occurrences have necessitated costly replacement of the catalyst charge owing to the substantially irreversible loss of catalytic activity. In the second, the heat-degradation occurs during catalyst preparation, for example, during the combination of the catalysts with an inert carrier, as by the melting and coating techniques. The high temperature to which the catalysts are exposed often render them heat-degraded and substantially irreversibly inactive, thereby restricting materially available catalyst preparation techniques.

An object of this invention is to furnish an improved method for regenerating and restoring the activity of heat-degraded bismuth-containing catalysts. Another object of this invention is to provide an improved method of regenerating heat-degraded catalyst comprising bismuth in combination with a metal of the left-hand column of Group VI of the Periodic Table of the Elements and oxygen. A more particular object is to provide an improved method of regenerating heat-degraded catalysts employed in the oxidative conversion of hydrocarbons consisting essentially of bismuth in combination with molybdenum and oxygen.

Bismuth-containing, heat-degraded, oxidative catalysts are regenerated, according to the present discovery, by a treatment which comprises contacting the heat-degraded catalyst with concentrated ammonium hydroxide. That such treatment can regenerate a heat-degraded or heat-inactivated catalyst, heretofore found substantially irreversible, is surprising when one considers treatments which, though apparently similar, will not effect a regeneration of these catalysts. Treatment with agents such as water, dilute nitric acid, and sodium hydroxide fail to overcome the inactivation induced by heat-degradation of the catalysts. Even treatment with such closely related agents as ammonia (gas) or aqueous methylamine fails to effect regeneration of the heat-degraded catalysts.

The manner of contacting the heat-degraded catalysts with concentrated ammonium hydroxide may vary within the scope of the invention. The catalyst may be immersed in aqueous ammonium hydroxide, slurried in it, or treated in any manner to insure contact of the catalyst surface with the liquid reagent. Alternatively, the catalyst may remain stationary, for example, left in a reactor, and the concentrated ammonium hydroxide caused to flow over the catalyst. In instances where the heat-degraded catalyst may have been subjected to temperatures approximating its melting point, it may at times be advantageous to reduce the particle size of the catalyst by crushing or grinding before commencing with the regeneration process. The contact time of catalyst and aqueous ammoniacal regeneration agent may be adjusted to the mode of contact. For immersion of the catalyst in the liquid reagent, a period of contact of from about several hours to about several days, for example four days, may be employed; contact times of from about 8 to 100 hours are generally preferred. For flow of the liquid reagent over the catalyst, shorter contact times are often employed, governed to some extent upon the flow rate used. Higher or lower times of contact may, however, be employed. The temperature of the ammonium hydroxide during its contact with the catalyst is not critical. Ambient air temperatures are generally satisfactory. Treatment of the catalysts at high temperatures, for example, up to about 100° C., with liquid or vaporized reagent is, however, comprised within the scope of the invention. Atmospheric, subatmospheric or superatmospheric pressures may be maintained during the treatment.

At the conclusion of the regeneration treatment, the now-active catalyst may be recovered from the treatment mixture by any of the simple and known physical methods of separation such as, for example, filtering, decanting, centrifuging, and the like. The catalyst is then dried and optionally, before reusing, may be again subjected to the known pretreating techniques mentioned above.

The concentrated ammonium hydroxide useful as the regeneration reagent for heat-degraded catalysts according to this invention may be a solution of from about 20 to about 35 weight percent of ammonia ($NH_3$) in water.

A convenient form of concentrated ammonium hydroxide to employ in the operation of this invention is the commercially available solution of approximately 28 weight percent of ammonia in water.

The aqueous ammonium hydroxide reagent used in the process of the invention need not be pure and may contain impurities of the type and in the amounts generally encountered in commercially available grades and that obtained as by-product in chemical operations. Such impurities may comprise salts such as ammonium nitrate, and the like. At times it is advantageous to employ the aqueous ammonium hydroxide in combination with a relatively inert organic solvent. Such suitable solvents comprise, for example, the lower alkanols, particularly methanol. Such organic solvents when used may constitute up to 40% by volume, but preferably not exceeding about 20% by volume, of the resulting aqueous ammonium hydroxide-solvent mixture.

The invention is applied broadly to heat-degraded bismuth-containing catalysts and particularly to those employed as catalysts in the oxidative conversion of hydrocarbons, for example, the oxidation, ammoxidation, and oxidative dehydrogenation of olefins. The invention is applied with particular advantage to the regeneration of heat-degraded bismuth-containing oxidative catalysts comprising bismuth in combination with a metal of the left-hand column of Group VI of the Periodic Table of the Elements (H. D. Hubbard, published by W. M. Welch Manufacturing Co., 1950 ed.) and oxygen. Of the Group VI metals, tungsten and molybdenum, and especially the latter, are the preferred elements. The invention is applicable to the treatment of such catalysts containing supplementary elements often present for the purpose of modifying activity such, for example, as copper, phosphorus, silicon, sulfur, iron, tin, lead, arsenic, antimony, silver, tellurium, cobalt, and the like. The heat-degraded catalysts treated in accordance with the invention may be obtained from any suitable source. They may have been prepared by any of the suitable methods of the prior art. The treatment of the invention may be applied to catalysts as such or to catalysts in combination with diluent materials, fillers, binding agents or the like in any amount. Such additional materials may comprise, for example, silica, diatomaceous earth (Celite), ball clay and other inert materials and any of the conventional relatively inert catalyst supports. This invention now makes it possible to support the catalyst upon an inert carrier material by the melting and coating technique.

The following examples are illustrative of the invention.

*Example 1*

A 3-ml. catalyst charge of fresh bismuth molybdate was placed in a 1 cm. I.D. glass reactor. The charged reactor was heated by means of an electric furnace to 400° C. A mixture consisting of 92% propylene and 6.4% oxygen was passed through the charged reactor, at a rate of 140 ml. per minute. Analyses of the exit gases by mass spectrometry and gas-liquid chromatography indicated that 100% of the oxygen was converted and that 1.92% of the gaseous exit gas was acrolein.

An unused portion of fresh bismuth molybdate was heat-degraded by heating at 850° C. overnight, thereby causing it to melt during the heating period. The resulting fused material was crushed, screened, and divided into seven separate portions of catalyst charge. One portion was retained untreated to demonstrate catalyst inactivation. The other six portions were treated with various reagents to determine the ability of these reagents to regenerate the heat-degraded catalyst. Each catalyst portion was then used as catalyst in the oxidation of propylene to acrolein under substantially the same conditions employed when using the untreated sample as set forth above. The particular regenerating reagent, conditions of treatment and results obtained in each of the separate oxidations are indicated in the following Table I.

TABLE I

| Reagent | Contact Time (days) | Volume of Catalyst Charge (m.) | Oxygen Conversion (Percent) | Acrolein in Exit Gases (Percent) | Effective Regeneration |
|---|---|---|---|---|---|
| None | | 2 | 1.9 | 0.08 | |
| Water | 3 | 3 | 7.6 | 0.07 | None. |
| Nitric acid, dil. (20 wt. percent) | 3 | 2 | 3.6 | 0.14 | None. |
| Sodium hydroxide (1.4 N) | 3 | 3 | 29.0 | 0.47 | Slight. |
| Ammonia (gas) | 1 | 3 | 11.0 | 0.11 | None. |
| Methylamine, aq. (25 wt. percent) | 4 | 3 | 56.0 | 0.80 | Partial. |
| Ammonium hydroxide, conc. (28 wt. percent) | 3 | 3 | 100.0 | 1.96 | Complete. |

Heretofore such oxidative catalysts, when degraded by heating to their melting points or beyond, could not be regenerated by any known method. The foregoing data demonstrates that treatment with concentrated ammonium hydroxide accomplishes the desired result of completely regenerating heat-degraded catalyst. The data also illustrate the efficacy of concentrated aqueous ammonium hydroxide when it is compared with other possible regeneration reagents.

*Example 2*

A portion of fresh bismuth molybdate was ground to a powder, then placed in a glass vessel and fluidized with a current of air. A portion of finely divided alumina catalyst support material (Norton SA 101 Alundum) was heated with a torch and then dropped into the fluidized bed of bismuth molybdate. Contact of the hot Alundum particles with the fluidized bed melted the bismuth molybdate, allowing it to coat the Alundum particles. The resulting supported catalyst was separated from unsupported bismuth molybdate. Four supported-catalyst charges, two untreated and two treated with concentrated ammonium hydroxide, were used in the process first described in Example 1, except that the reactor temperature was changed to that noted in Table II, which contains the data resulting from the use of supported catalyst.

TABLE II

| Regeneration Reagent | Contact Time (days) | Volume of Catalyst Charge (ml.) | Reactor Temperature (°C.) | Oxygen Conversion (Percent) | Acrolein in Exit Gases (Percent) |
|---|---|---|---|---|---|
| None | | 3 | 405 | 5.1 | 0.2 |
| Ammonium hydroxide, conc. (28 wt. percent) | 3 | 3 | 405 | 48.0 | 0.94 |
| None | | 3 | 425 | 24.4 | 0.6 |
| Ammonium hydroxide, conc. (28 wt. percent) | 3 | 3 | 425 | 96.0 | 1.68 |

This example demonstrates the successful regeneration of a supported oxidative catalyst which had become inactive due to the temperature rigors imposed by the melt technique of preparing catalyst supported upon an inert carrier. The method of this invention makes this technique operable and feasible for supporting oxidative catalysts.

The foregoing examples are intended merely as illustrations of this invention and are not to be construed as limitations upon the scope of the invention.

I claim as my invention:

1. The method of regenerating inactive catalyst which has undergone heat degradation during use in the oxidative conversion of hydrocarbons and which consists essentially of bismuth in combination with oxygen and a metal selected from the group consisting of molybdenum and tungsten, by contacting the heat-degraded catalyst with ammonium hydroxide containing from about 20 to about 35 percent by weight of ammonia in water.

2. The method in accordance with claim 1 wherein said heat-degraded catalyst additionally contains copper.

3. The method in accordance with claim 1 wherein said heat-degraded catalyst additionally contains phosphorus.

4. The method in accordance with claim 1 wherein said heat-degraded catalyst is essentially bismuth moylbdate.

References Cited by the Examiner
UNITED STATES PATENTS
2,758,958   8/1956   Anhorn et al. _____ 252—438 X OSCAR R. VERTIZ, *Primary Examiner.*

A. J. GREIF, *Assistant Examiner.*